United States Patent [19]

Clausen et al.

[11] Patent Number: 4,509,822
[45] Date of Patent: Apr. 9, 1985

[54] TRANSPARENT REAR PROJECTION SCREEN

[75] Inventors: Erik Clausen; Johannes Clausen, both of Gentofte, Denmark

[73] Assignee: Scan Screen A/S, Roskilde, Denmark

[21] Appl. No.: 519,702

[22] Filed: Aug. 2, 1983

[30] Foreign Application Priority Data

May 10, 1983 [DK] Denmark ............................ 2090/83

[51] Int. Cl.³ ............................................ G03B 21/60
[52] U.S. Cl. .................................................. 350/128
[58] Field of Search ............................... 350/127, 128

[56] References Cited

U.S. PATENT DOCUMENTS

| | | | |
|---|---|---|---|
| 2,529,701 | 11/1950 | Maloff | 350/128 |
| 2,738,706 | 3/1956 | Thompson, Jr. | 350/128 X |
| 3,580,661 | 5/1971 | Cooper, Jr. | 350/128 |
| 4,379,617 | 4/1983 | Funakoshi et al. | 350/128 X |
| 4,418,986 | 12/1983 | Yata et al. | 350/128 |
| 4,468,092 | 8/1984 | Inoue et al. | 350/128 |
| 4,469,402 | 9/1984 | Yata et al. | 350/128 |

Primary Examiner—Richard A. Wintercorn
Attorney, Agent, or Firm—Watson, Cole, Grindle & Watson

[57] ABSTRACT

A transparent rear projection screen has a lense system for paralleling light arriving from behind. On the front side of the screen rectilinear lenses extending in the vertical direction in the position of use of the screen are provided the sides of which form a small angle of inclination with respect to the normal to the screen. The sides are totally reflecting to light arriving from behind and between the reflecting lenses further lenses are arranged. In order to compensate for color shading by the projection of differently colored television images upon the rear side of the screen, the tops of the reflecting lenses are so shaped and their totally reflecting sides have such an inclination with respect to the normal to the screen, and moreover have such a width that at the most 80% of the light which from behind enters the reflecting lenses is emitted through the tops of the lenses, and that at least 20% of said entering light is emitted through the sides of the lenses.

6 Claims, 10 Drawing Figures

TRANSPARENT REAR PROJECTION SCREEN

BACKGROUND OF THE INVENTION

The present invention relates to a transparent rear projection screen having a lense system for paralleling light arriving from behind and, on the front side of the screen, rectilinear lenses extending in the vertical direction in the position of use of the screen, the sides of the lenses having a small angle of inclination with respect to the normal to the screen and being, at least along a part of their width, totally reflecting to light arriving from behind, and comprising further lenses arranged between the reflecting lenses.

Screens of the kind referred to above are known from European Patent Application No. 82102985.7, publication No. 0063317. According to said prior art the reflecting lenses are so constructed that the light beams which extend parallel with the normal to the screen and impinge the inner surfaces of the totally reflecting lense side parts are reflected out through the tops of the lenses concerned. The tops of the lenses are convexly rounded and form sharp corners with respect to the sides of the lenses concerned, viz. in such a way that beams which from the inner side impinge the side parts of the tops of the lenses, and which extend parallel with the normal to the screen, are not totally reflected but on the contrary pass out through the top of the lense while being refracted. The totally reflecting lense side parts result in that the light emitted from the tops of the lenses is refracted more in the lateral direction than otherwise would be the case, because the totally relfected light, before passing out through the tops of the lenses, has been diverged an angle corresponding to twice the angle which the totally reflecting parts form together with the normal to the screen. Between the lenses referred to above, trough-shaped grooves are provided the bottoms of which constitute convex or concave further lenses. The further lenses will diverge light extending parallel with the normal to the screen and impinging the inner surfaces of the further lenses. However, the spreading which may be achieved by means of such further lenses is rather limited and this is the reason why the lenses having totally reflecting side parts referred to above are used which, as previously explained, have the effect that the spreading of the light emitted through the tops of these lenses will be greater than the spreading of light emitted from lenses impinged solely by light arriving parallel with the normal to the screen. Accordingly, due to the totally reflecting lense side parts it is achieved that the image projected may be seen at wider side viewing angles than the case otherwise would be.

The screens referred to above are used in connection with video projectors, for micro film readers and as projection screens for computers.

It is the object of the present invention to provide a screen as stated above which in particular is suitable for projecting colour television images. It is known to produce coloured projected television images by directing three projectors, each projecting a black-white television image against the rear side of a transparent projection screen. The images from each of the three projectors are coloured, e.g. red, green and blue, respectively, by positioning a correspondingly coloured filter in front of the picture tube of each of the projectors. The three projectors are arranged side by side and are directed in such a way that the images emitted from the tubes cover each other as far as possible when the images are watched from the front side of the screen. Due to the fact that the three projectors cannot be arranged with their optical axes coaxially, the projectors are arranged side by side but such arrangement, on the other hand means that their optical axes will form angles with each other. Normally it is estimated that the projectors cannot be arranged closer adjacent each other than corresponding to an angle of 7° between the optical axes of the projectors. However, the development in direction towards projectors having increasing light intensity may result in that the angles referred to may increase even up to 12°.

If e.g. the green image is projected perpendicular upon the rear side of the screen, the blue and the red images will be projected upon the rear side of the screen at an inclination of e.g. said 7° with respect to the normal to the screen. However, the result will be that a person, which watches the screen obliquely from in front, will see an image which is either blue or red dominated depending upon whether the person concerned is positioned closer to the optical axis of the projector emitting the blue or to the axis of the projector emitting the red image. Such colour distortion will in the present specification be termed "colour shading".

SUMMARY OF THE INVENTION

It is the object of the present invention to provide a screen which effectively avoids or reduces the colour shading effect, and this object is according to the present invention achieved by means of a screen, as referred to in the first paragraph of the present specification, wherein the tops of the reflecting lenses being so shaped and the totally reflecting parts of the sides of the reflecting lenses having such an inclination with respect to the normal to the screen and such a width that at the most 80% of the light which from behind enters the reflecting lenses is emitted through the tops of the relfecting lenses, and that at least 20% of said light is emitted through the sides of the reflecting lenses. By means of such screen it is achieved that the colour shading referred to above is reduced or eliminated which is due to the fact that the totally reflected light, emitted through the sides of the reflecting lenses, will be inversed with respect to the light emitting from the further lenses, and, accordingly, the inversed light will compensate for or reduce the colour shading which the further lenses would cause if no totally reflecting lenses were provided. A person which accordingly watches the screen concerned obliquely from in front will, theoretically, by watching the further lenses see an image, which is dominated by the colour of the image projected by means of the projector directed towards the person in question, but, simultaneously, the person in question by watching the sides of the totally reflecting lenses will see an image which is dominated by the colour of the image projected by means of the projector directed away from the person concerned, and accordingly the result will be that the person in question will watch two superimposed images having opposite or inversed colour shading which accordingly will compensate each other. Simultaneously, the advantage is achieved which is connected with lenses having totally reflecting sides, viz. that the image may be watched at wide side angles. It will be understood that the ratio between the light emitted through the tops of the reflecting lenses and the light emitted through the sides of the lenses may vary within broad ranges depending upon how pronounced a colour shading the further lenses would produce in case the screen concerned had only such further lenses. According to the present invention the ratio between the light emitted through the tops of the reflecting lenses and the light emitted through the sides of the reflecting lenses may, accordingly, lie in the range between $\frac{3}{4}$ and $\frac{1}{4}$, preferably in the range between $\frac{5}{8}$ and $\frac{3}{8}$ and may appropriately be approximately $\frac{1}{2}$.

The lenses for screens of the kind here concerned are very narrow (0.1-1,0 mm) which means that the tops of the reflecting lenses should be kept within fine tolerances in order to avoid that all the light entering a reflecting lense is emitted through the top of the lense. Accordingly, the tops of the reflecting lenses may according to the present invention have radii of curvature which lie in the range between 0.015 and 0.07 mm, preferably between 0.04 and 0.06 mm, and appropriately be approximately 0.05 mm. According to the invention the totally reflecting side parts of the reflecting lenses may form a vertical angle lying between 35° and 56°, preferably between 38° and 47° and may appropriately be approximately 42°. Furthermore the widths of said lenses may lie between 0.1 and 0.4 mm, preferably between 0.15 and 0.3 mm and may appropriately be approximately 0.2 mm.

Moreover, in order to achieve an appropriate balance between inversed and not inversed light, the reflecting lenses according to the invention may cover between $\frac{1}{4}$ and $\frac{3}{4}$, preferably between $\frac{5}{8}$ and $\frac{3}{8}$, and may appropriately cover $\frac{1}{2}$ of the total area of the front surface of the screen.

DESCRIPTION OF THE PREFERRED EMBODIMENTS

Figure 1:
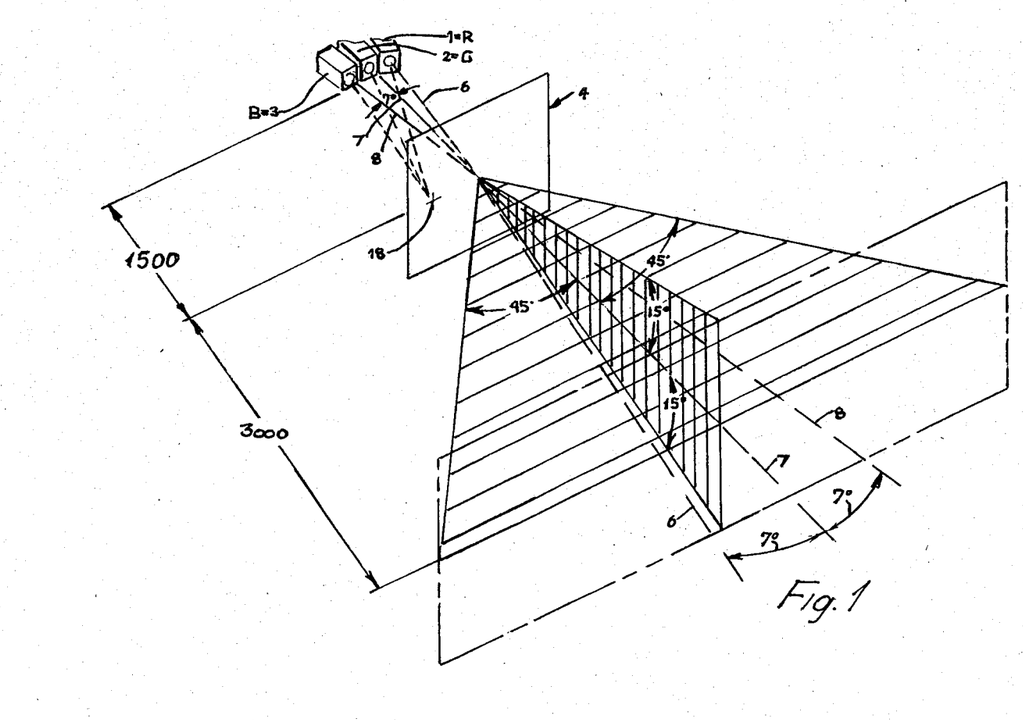
FIG. 1 is a perspective schematical picture for illustrating the use of projection screens of the kind here concerned.

On the drawing, reference numerals 1, 2 and 3 designate three projectors for projecting television images towards the rear side of a projection screen 4. Each of the projectors emits a black-white television image, but in front of the projector 1 a filter is positioned in such a way that the image emitted from the projector 1 towards the screen 4 will be red, in front of the projector 2 a filter is arranged in such a way that the image emitted from the projector 2 towards the screen 4 is green, and as regards the projector 3 a filter is used in such a way that the image issued from the projector 3 will be blue. The three projectors 1, 2 and 3 are arranged side by side with the optical axis of the centre projector 2 extending perpendicular to the centre of the screen 1. Due to the fact that the projectors have a certain dimension in the lateral direction, the projectors cannot be arranged with their axes 6 and 8 coaxially with the axis 7 and instead the three optical axes form angles of 7° with each other. It is difficult to reduce the 7° due to the size of the projectors. The three optical axes are directed towards the centre of the screen 4, and, furthermore, the projectors are so arranged that the images projected upon the rear side of the screen 4 cover each other as exactly as possible. The result is that from the front side of the screen 4 an image may be watched corresponding to the image emitted by a colour television picture tube, but of a better quality and of a greater size. In FIG. 1 an auditorium is indicated by means of a frame shown in dotted lines. The formation of the television image on the screen 4, of course, depends upon image forming capacities of the screen which normally are achieved by light diffusing material being added to the material of the screen.

On FIG. 1, the path of beams from the three projectors and to the centre of the screen 4 is shown together with the path of rays from the three projectors and to a point 18 of the screen which is positioned to the left of the centre. If the point 18 is viewed by a viewer in the auditorium to the left of the centre of the screen such person, provided the screen 4 is only light refracting, will see an image dominated by the colour of the projector 1, viz. in the present instance red, which has been marked by a R in FIG. 1. This is simply due to the fact the viewer concerned is positioned more close to the optical axis of the projector 1, which points towards the viewer concerned, than to the optical axis of the projector 3 emitting the blue image and the optical axis of which points away from the viewer concerned. This phenomena is also due to the fact than the angles between the beams from the three projectors which impinge the point 18 cannot be changed by refraction in the screen 4 because all the beams will be refracted to the same degree, and, accordingly, after having passed through the screen, the beams will form exactly the same angles with each other.

The object of the present invention is to reduce or to avoid such colour shading.

Figure 2:
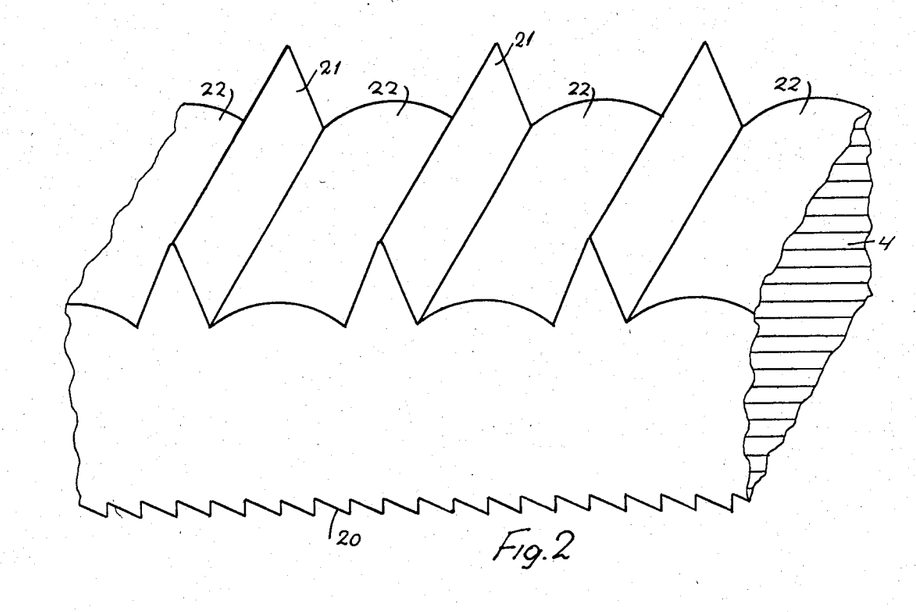
FIG. 2 is a perspective segment of an embodiment of the screen according to the invention.
Figure 3:
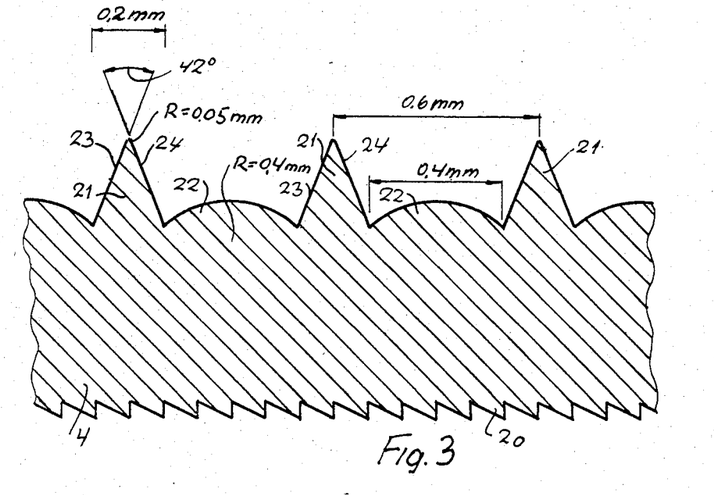
FIG. 3 is an end view of the section shown in FIG. 2.
Figure 4:
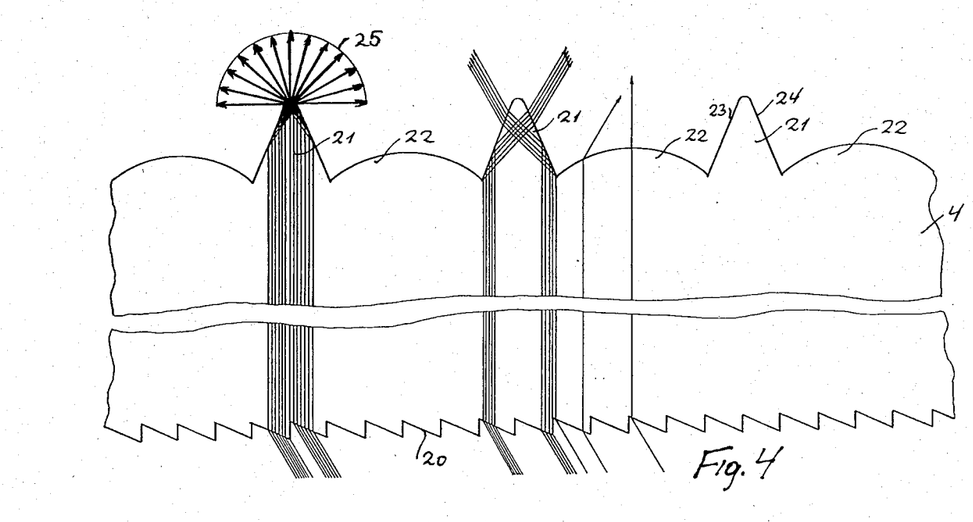
FIG. 4 is a picture corresponding to FIG. 3 illustrating the principles for the path of beams through the screen concerned.

FIG. 2 shows a section of an embodiment of the screen according to the present invention. The screen consists of light refracting material, e.g. acryl. On the rear side, i.e. the side intended to face the projectors 1,2 and 3, the screen is provided with a lense system for paralleling the light arriving from behind. This lense system consists in the embodiment here concerned of a Fresnel-lense 20 and by the use of the screen the centre projector 2 is arranged in the focus of the Fresnel-lense. This means that the green beams impinging the rear side of the screen will be aligned so as to extend parallel with each other through the screen and parallel with the normal to the screen. On the front side the screen is provided with two sets of rectilinear lenses 21 and 22 respectively, which accordingly during the use of the screen faces the audience, and which moreover in said position of use extend vertically. The shape and the dimensions of the lenses 21 and 22 appear clearly from FIG. 3 from which it will be seen that the lenses 21 according to the embodiment illustrated therein consist of two side surfaces 23 and 24 forming an angle of 42° with each other. Moreover, the tops of the lenses 21 are rounded and have a radius of curvature of 0.05 mm. Moreover, the lenses 21 have a width at their inner ends of 0.2 mm. The lenses 22 have a width of 0.4 mm and a radius of curvature also of 0.4 mm. In FIG. 4 a part of the path of beams through the screen concerned is shown. For the sake of clarity a division of the path of beams through the lenses 21 has been made, and furthermore in FIG. 4 only the path of beams for green light is shown, which, as explained above, is aligned by means of the Fresnel-lense 20, from the conical bundle of light emitted from the projector 2 and into parallel light, which extends through the screen 4 parallel with the normal to the screen. From FIG. 4 it will be seen that almost all the green light, which according to the embodiment illustrated, enters the lenses 21, will be totally reflected from the sides of these lenses. This is due to the fact that these sides form a comparatively acute angle with respect to the normal of the screen, viz. so acute that the angle of incidence towards the inner surfaces of the lense sides exceeds the angle at which refraction out through the lense sides would occur. As it appears from FIG. 4, as regards the left hand lense 21, the light impinging the lense 21 adjacent the top of the lense will be totally reflected towards the top and the major part of this light will be refracted as indicated by means of a bundle of vectors 25. On the contrary, the beams which impinge the lense sides at a greater distance from the top of the lense will as it appears from the centre lense 21 in FIG. 4 be reflected towards the opposite side of the lense and will impinge the opposite side at angles of incidence so small that the light in question will be emitted from the lense simultaneously with a refraction of the light, viz. corresponding to the path of beams from the optically more dense material and into an optically less dense material represented by the material of the screen 4 and the air, respectively. In FIG. 4 it is also illustrated how the path of beams will be as regards the further lenses 22, seeing that a beam which impinges the centre of the inner surfaces of the further lenses, and which extends parallel with the normal to the screen will pass unrefracted through the screen whereas beams which impinge the inner surface of the further lenses offset with respect to the optical axes of the further lenses will be refracted. The width and the curvature of the lenses 22 are selected in such a way that also the parallel beams impinging the side parts of the further lenses will be emitted from the lenses while being refracted. However, it is rather limited to what degree the lenses 22 may spread the emitting light in the lateral direction. If the lenses 22 have a radius of curvature which is too small, the parallel light which impinges the inner surfaces of the side parts of the lenses 22 will be totally reflected, cf. the total reflection which is caused by the sides of the lenses 21. However, the light emitted through the tops of the lenses 21 on the contrary will be spread or diverged to a high degree due to the fact that such light previously has been totally reflected from the inner surfaces or the lense sides, cf. the bundle of vectors 25.

Figure 5:
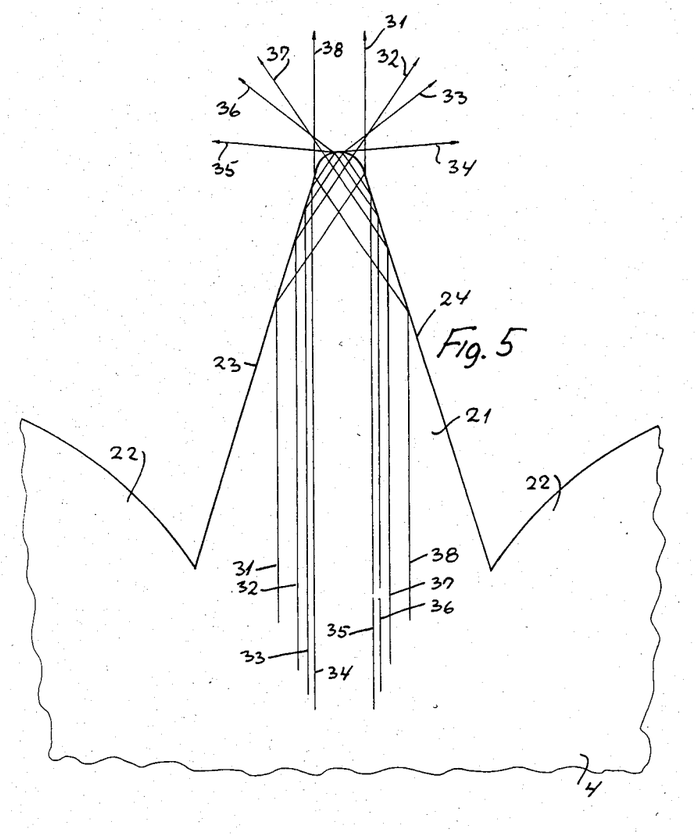
FIG. 5 is a section on an increased scale of the screen shown in FIG. 4 illustrating the path of beams at the top of a lense.
Figure 6:
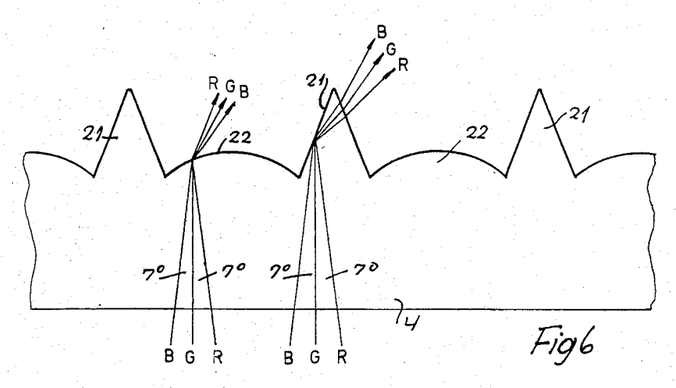
FIG. 6 is a section corresponding to FIG. 4 illustrating lateral inversion of the path of beams.
Figure 7:
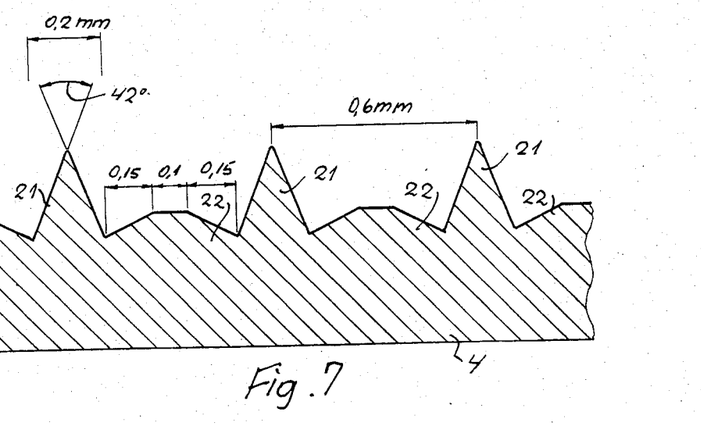
FIGS. 7-10 are pictures corresponding to FIG. 3 illustrating different amended embodiments of the screen according to the invention.
Figure 8:
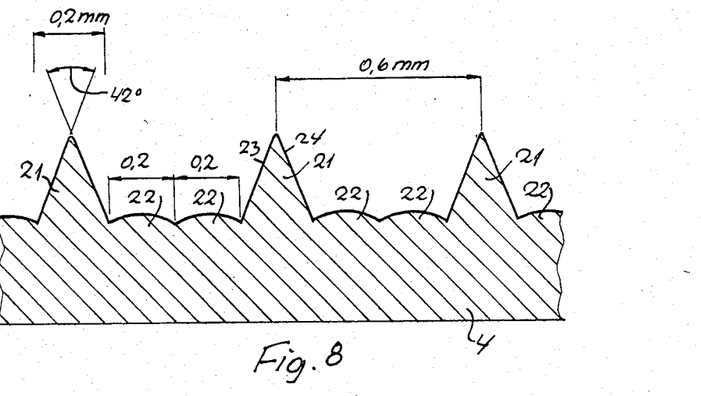
Figure 9:
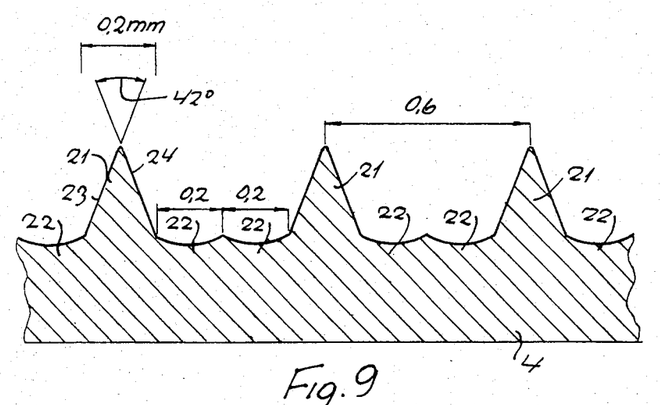
Figure 10:
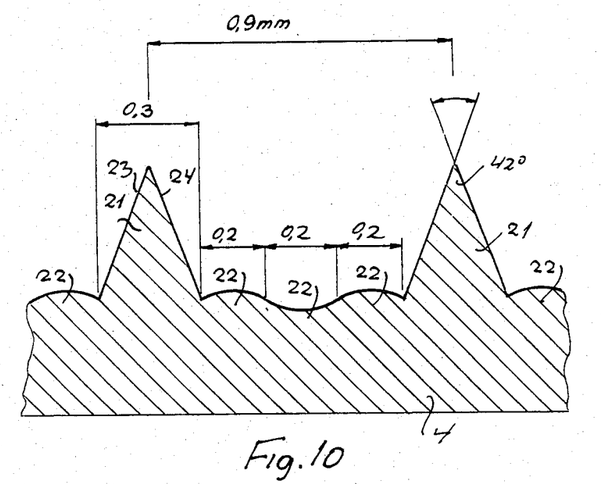

This condition appears clearly from the drawing shown on an increased scale in FIG. 5. As it appears from said FIG. 5, the radius curvature at the tops of the lenses 21 is very short and, accordingly, the tops of the lenses are highly refractive which, combined with the fact that a major part of the beams impinging the inner surfaces of the tops previously have been diverged corresponding to two times the angle of inclination of the lense sides, results in that the light emitted will be spread as indicated by means of the bundle of vectors 25 in FIG. 4. According to the embodiment shown in FIG. 5, the beams 31–38 shown therein, and which impinge the sides of the lense 21 shown closely below the top of the lense, will be totally reflected and will impinge the inner surface of the top at such small angles of incidence that the beams concerned will be issued through the top while being refracted. Moreover, it will be understood that the parallel beams which impinge the inner surface of the top between the parallel beams 33 and 34, and which also has a sufficiently small angle of incidence, will issue through the top while being refracted whereas, however, the parallel beam which impinge exactly the centre of the top will pass unrefracted out through the top. However, due to the fact that the top of the lense 21 is smoothly rounded without edges, minute side areas will exist at which arriving light will be totally reflected towards the inner surface of the top and impinge the inner surface at such wide angles of incidence that such light will be totally reflected at the top, but the light which may be lost in this way is negligible as compared to the light which passes through the screen. Previously, only the path of beams for the green light has been explained for the sake of clarity. From FIG. 6 it will be seen that the blue and the red beams (designated B and R, respectively) will extend through the screen 4 illustrated at angles of 7° with respect to the green beams. This is due to the fact that all the beams will be refracted equally at their entrance through the Fresnel-lense at the rear side of the screen (not shown in FIG. 6), and accordingly the blue and the red beams extend through the screen angularily offset corresponding to the angular offsetting between the optical axes of the projectors. From FIG. 6 it will be seen that a blue, a green and a red beam impinging at the same point on the inner surface of the further lense 22 will be refracted equally at their emission from the screen, and accordingly said beams will also form angles of 7° together with each other after having been emitted. The blue beam will obtain the widest angle of emission with respect the normal to the screen, because the blue beam previously had an inclination with respect to the normal. This fact will apply generally for all blue beams, and accordingly a viewer, looking at the screen in question from a point which in FIG. 6 is positioned to the right and above, will see an image which is blue dominated. This of course only applies under the condition that the screen were provided only with the lenses 22. From the path of beams in FIG. 6 it will be seen that the blue, the green and the red beams impinging a reflecting side of a lense 21, and which are emitted through the opposite side, will be inversed or form the mirror image with respect to the beams emitted through the further lenses 22. Accordingly, a viewer watching the sides of the lenses 21 from a point positioned to the right and above in FIG. 6 will receive an image from the sides of the lenses 21 which is red dominated, of course under the condition that the person in question did not simultaneously receive the image from the lenses 22. However, seeing that this is the fact, the viewer will, accordingly, receive both a red and a blue dominated image and these images will be superimposed to the viewer in such a way that the person sees a picture without colour shading.

In order to achieve the colour compensation aimed at it will be understood that a considerable portion of the light which is totally reflected from the sides of the lenses 21 should impinge upon the opposite sides at angles of incidence which are so small that the beams concerned are emitted through the sides. In order to achieve these requested effects, nor more than 80% of the light entering the lenses 21 should be emitted through the tops of the lenses 21, viz. as illustrated as regards the left hand lense 21 in FIG. 4 whereas not less than 20% of this light should be emitted through the sides of the lenses 21, viz. as illustrated in FIG. 4 as regards to centre lense 21. The ratio between these two light fractions depends upon the vertical angle of the lenses 21, the width of the reflecting sides of the lenses 21 and the radius of curvature of their tops. Simultaneously, it will be understood that this ratio also depends upon how much of the area of the front side of the screen is occupied by the lenses 21. Depending upon this conditions the ratio between the light issued through the tops of the lenses 21 and the light emitted through the sides of these lenses lie between ¾ and ¼, preferably between ⅝ and ⅜ and may appropriately be approximately ½. The radius of curvature of the tops of the lenses 21 also, as will be understood, is of significant importance to the ratio between the light emission from the tops of the lenses 21 and from the sides thereof, and this radius of curvature may lie between 0.015 and 0.07 mm, preferably between 0.04 and 0.06 mm, and appropriately will be approximately 0.05 mm. The vertical angle of the lenses 21, viz. the inclination of the sides of the lenses 21 with respect to each other may lie between 35° and 56°, preferably between 38° and 47° and may appropriately be approximately 42°. Also the actual width of the lenses 21 at their inner ends is of importance, in particular as regards the sharpness of the image formed, and this width may lie between 0.1 and 0.4 mm, preferably between 0.15 and 0.3 mm and may appropriately be approximately 0.2 mm. Moreover, in order to achieve an appropriate ratio between the highly diverged beams emitted through the tops of the lenses 21 as indicated by means of the bundle of vectors 25 in FIG. 4, and the colour compensating beams emitted through the sides of the lenses 21 and the beams emitted through the further lenses 22, the lenses 21 may appropriately according to the present invention occupy between ¼ and ¾, preferably between ⅝ and ⅜ and may appropriately occupy approximately ½ of the total front surface of the screen. From the width measures in FIG. 3 it will be seen that the lenses 21 in the embodiment illustrated therein occupies ⅓ of the front surface of the screen and the lenses 22 occupy the remaining ⅔.

In FIGS. 7-10 different embodiments of the screen according to the invention are shown in particular as regards the further lenses. According to the embodiment shown in FIG. 7 the further lenses are formed as convex angular lenses having the measurements indicated. According to FIG. 8 the further lenses 22 are dual, or in other words two such further lenses are arranged between each two reflecting lenses 21. According to FIG. 9 the further lenses are shaped as dual concave lenses, and according to the embodiment of FIG. 10 further lenses in the form of a combination of two convex lenses arranged along each side of a concave lense are used. In all these embodiments the further lenses 22 serve to spread the light in the lateral direction in order to achieve good side viewing relationship which is further improved due to the light emission through the tops and the sides of the lenses 21.

It should be further noticed that the light emitted through the tops of the lenses 21 on the drawing is illustrated as if it was emitted very regularly, cf. the bundles of vectors 25 in FIG. 4. This, however, is due to the fact that in said figure, as previously mentioned, only the green light has been illustrated. If also the blue and the red lights are taken into consideration and the lacking parallelism thereof with respect to the blue light it will be understood that a "mixing" of the light emitted through the tops of the lenses 21 will occur in such a way that due to said light also no colour shading will result. On the contrary, said light contributes to a considerable improvement of the side viewing conditions. Also the "mixing" of the red, blue and green beams occurring at the tops of the lenses 21, due to the high concentration of said beams, will add to reduce the colour shading.

The different embodiments of the rear projection screen according to the invention shown on the drawing will due to their optical conditions, spread the light in the lateral direction. In order also to obtain a certain light spreading effect in the vertical direction light refracting particles may be added to the screen without changing the other characteristics of the screens. The amount of such light diffusing particles should at the most be approximately 50 g/m² when said particles have an index of refraction within the range: 1.5–1.6 and a grain size varying from $0.5\mu$ to $90\mu$. It is preferred to let the light refracting powder sediment during the production of the screen, viz. in such a way that the powder will form a well defined layer at the front surface of the screen.

We claim:

1. Transparent rear projection screen having a lense system for paralleling light arriving from behind and, on the front side of the screen, rectilinear lenses extending in the vertical direction in the position of use of the screen, the sides of the lenses having a small angle of inclination with respect to the normal to the screen and being, at least along a part of their width, totally reflecting to light arriving from behind, and comprising further lenses arranged between the reflecting lenses, wherein the tops of the reflecting lenses being so shaped and the totally reflecting parts of the sides of the reflecting lenses having such an inclination with respect to the normal to the screen and such a width that, at the most, 80% of the light, which from behind enters the reflecting lenses, is emitted through the tops of the reflecting lenses and that, at least, 20% of said light is emitted through the sides of the reflecting lenses.

2. Screen according to claim 1, wherein the ratio between the light emitted through the tops of the reflecting lenses and the light emitted through the sides of the reflecting lenses lies in the range between ¾ and ¼, preferably in the range between ⅝ and ⅜, and appropriately is approximately ½.

3. Screen according to claim 1, wherein the tops of the reflecting lenses are convexly rounded, said tops having a radius of curvature lying between 0.015 and 0.07 mm, preferably between 0.04 and 0.06 mm, and appropriately is approximately 0.05 mm.

4. Screen according to claim 1, wherein the reflecting lenses occupy between ¼ and ¾, preferably between ⅝ and ⅜, and appropriately approximately ½ of the total front side of the screen.

5. Screen according to claim 1, wherein the further lenses have convexly or concavely rounded or angular cross section.

6. Screen according to claim 1, wherein the sides of the reflecting lenses totally reflecting to light arriving from behind are transparent to light reflected from an opposite side of said lenses.

* * * * *